United States Patent
Miao et al.

(10) Patent No.: US 8,600,243 B2
(45) Date of Patent: Dec. 3, 2013

(54) POLARIZATION MODE DISPERSION COMPENSATION

(75) Inventors: Houxun Miao, Gaithersburg, MD (US); Andrew M. Weiner, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 730 days.

(21) Appl. No.: 12/425,919

(22) Filed: Apr. 17, 2009

(65) Prior Publication Data

US 2009/0285582 A1    Nov. 19, 2009

Related U.S. Application Data

(60) Provisional application No. 61/046,128, filed on Apr. 18, 2008.

(51) Int. Cl.
*H04B 10/2569* (2013.01)

(52) U.S. Cl.
USPC ........... 398/208; 398/147; 398/152; 398/159; 398/184; 398/194

(58) Field of Classification Search
USPC .................. 398/159, 147, 152, 184, 194, 208
See application file for complete search history.

(56) References Cited

U.S. PATENT DOCUMENTS

| | | | |
|---|---|---|---|
| 5,719,650 A | 2/1998 | Wefers et al. | |
| 6,437,892 B1 * | 8/2002 | Fang et al. | 398/152 |
| 7,116,419 B1 * | 10/2006 | Weiner et al. | 356/364 |
| 7,369,773 B2 | 5/2008 | Weiner | |
| 2001/0008452 A1 * | 7/2001 | Sugihara et al. | 359/124 |
| 2003/0118263 A1 * | 6/2003 | Phua et al. | 385/11 |
| 2009/0310207 A1 * | 12/2009 | Maestle | 359/249 |

OTHER PUBLICATIONS

Chou, P., et al., "Real-Time Principal State Characterization for Use in PMD Compensators," IEEE Photonics Technology Letters, vol. 13, No. 6, Jun. 2001, © 2001 IEEE, pp. 568-570.

Miao, H., et al., "Broadband all-order polarization mode dispersion compensation via wavelength-by-wavelength Jones matrix correction," Optics Letters/vol. 32, No. 16/Aug. 15, 2007, © 2007 Optical Society of America, pp. 2360-2362.

Miao, H., et al., "Wideband Deterministic All-Order Polarization-Mode Dispersion Generation via Pulse Shaping," IEEE Photonics Technology Letters, vol. 20, No. 2, Jan. 15, 2008, © 2007 IEEE, pp. 159-161.

Miao, H., "All-Order Polarization Mode Dispersion Compensation," Dissertation, Aug. 2008, Purdue University, West Lafayette, Indiana, 115 pages.

(Continued)

*Primary Examiner* — Leslie Pascal
(74) *Attorney, Agent, or Firm* — Brinks Gilson & Lione

(57) ABSTRACT

An apparatus and method for correcting for the polarization mode distortion of an optical signal is described. The optical data signal to be transmitted is processed by a switch configured to place the signal into a plurality of polarization states on a periodic basis. At the receiving end of the system, a portion to the signal is coupled to a polarimeter and the wavelength-dependent state of polarization (SOP) of the received signal determined for the plurality of polarization states imposed on the transmitted signal. The data for two of the transmitted polarization states is selected to be used as the basis for correcting the SOP so as to compensate for the wavelength dependence thereof. The corrections may be applied in an optical pulse shaper.

42 Claims, 7 Drawing Sheets

(56) References Cited

OTHER PUBLICATIONS

Miao, H., "All-Order Polarization Mode Dispersion Compensation (PMD) via Virtually Imaged Phased-Array (VIPA) Based Pulse Shaper," pp. 1-3.

Phua, P.B., et al., "All-Frequency PMD Compensator in Feedforward Scheme," Journal of Lightwave Technology, vol. 22, No. 5, May 2004, © 2004 IEEE, pp. 1280-1289.

Wang, S.X., et al., "Broadband, high spectral resolution 2-D wavelength-parallel polarimeter for Dense WDM systems," Nov. 14, 2005/vol. 13, No. 23/ Optics Express, © 2005 OSA, pp. 9374-9380.

Weiner, A.M., "PMD Compensation at Ultra-High Bit Rates or Optical Spectral Processing/All-Order PMD Technology: Compensation, Sensing, Emulation," (OFC 2008), Purdue University Ultrafast Optics & Optical Fiber Communications Laboratory, 55 pages.

"Scrambling to Reduce Polarization Related Impairments", Application Note Apr. 2003; Downloaded Oct. 12, 2012, from Website: www.generalphotonics.com.

* cited by examiner

POLARIZATION MODE DISPERSION COMPENSATION

This application claims the benefit of priority to U.S. provisional application Ser. No. 61/046,128 filed on Apr. 18, 2008, which is incorporated herein by reference.

STATEMENT OF GOVERNMENT SPONSORSHIP

This invention was made with Government support under contract 0501366-ECS awarded by the National Science Foundation. The Government has certain rights in this invention.

TECHNICAL FIELD

The present application may relate to the measurement and correction of dispersion in optical systems, and in particular to the use in telecommunications or sensing.

BACKGROUND

Optical telecommunications systems may use single-mode or multimode optical fibers to guide light having data modulations imposed thereon so as to transmit information over a distance. Typically the transmission distance is limited by such factors as power loss in the fiber, and the dispersion or distortion of the signal due to intrinsic properties of the optical waveguide, or imperfections in the fiber due to manufacturing defects, the environment, or non-linear effects such as four-wave mixing. Two types of linear distortion mechanisms are chromatic and polarization mode dispersion.

Chromatic, or intramodal, dispersion occurs in both single mode and multimode optical fibers. Chromatic dispersion occurs because different wavelengths of light travel through the fiber waveguide at different speeds. Since the different wavelengths of light have different velocities, some wavelengths of a signal arrive at the fiber end before others. This delay difference leads to pulse broadening.

In an ideal optical fiber, the light-guiding core has a perfectly circular cross-section, and the fundamental electromagnetic propagating mode may be described as having two orthogonal polarizations that travel at the same velocity at each wavelength. The orientation of the polarization axes with respect to the local fiber axis is not a consideration, as the two polarizations propagate with identical properties due to the circular symmetry of the fiber. However, in practice, this ideal state is not achieved, and there are asymmetrical propagation properties with respect to the polarization components.

Symmetry-breaking imperfections fall into several categories: geometric asymmetry: e.g., slightly elliptical cores; and, stress-induced material birefringence. These can arise from either imperfection in manufacturing (which is never perfect or stress-free) or from thermal and mechanical stresses imposed on the fiber when installed is a system. The latter stresses may vary with time, for example, as the temperature changes. These effects cause the polarization and delay of a signal transmitted over a distance to vary as a function of wavelength and time in an apparently random manner, and is called polarization mode dispersion (PMD).

PMD is a factor limiting the upgrade of existing optical fiber communication systems and on the transmission bandwidth in new designs. Traditional PMD compensators typically work in a low-order (first- and second-order as function of wavelength) PMD approximation. In the first-order approximation, the effect of PMD is modeled as a birefringence with frequency-independent magnitude and with frequency-independent axes (which are often called the principal states of polarization (PSP)). However, as the bandwidth of telecommunication systems increases, higher-order PMD effects become increasingly important, and the PSPs and the magnitude of the equivalent birefringence become strongly frequency dependent.

SUMMARY

An apparatus for compensating distortion of an optical signal is disclosed, including a receiver, adapted to accept the optical signal from a proximal end of an optical network. The receiver includes a polarimeter for characterizing the wavelength dependent state of polarization of the received signal. A controller is configured to analyze the polarimeter data so as to determine the wavelength dependent optical network characteristics and the corrections needed to compensate such characteristics. A pulse shaper is controlled to perform the compensation so that the effects of the optical network are mitigated. The optical signal transmitted over the optical network may have data modulated thereon. At the transmitting end of the optical network the state of polarization (SOP) of the optical signal is modified by a polarization transfer matrix switch such that there are at least two states of polarization, prior to coupling the optical signal to the optical network.

In another aspect, an apparatus for transmitting an optical signal having a data modulation includes a polarization transfer matrix switch, the switch being configurable to modify the SOP of the optical signal to at least two polarization states prior to transmission over an optical fiber, and a switching rate of the polarization transfer matrix switch is substantially lower than a data rate of the data modulated on the optical signal, In yet another aspect, a system for compensation of distortion of an optical signal includes a transmitting portion and a receiving portion. The transmitting portion may include a polarization transfer matrix switch, the switch being configurable to periodically modify the state of polarization (SOP) of an input optical signal between at least two output optical signal polarization states. The switch output signal may be coupled to an input of an optical transmission device. The receiving portion is adapted to receive an optical signal output by the optical transmission device, and further comprises a polarimeter and a pulse shaper.

A method of compensating for distortion of an optical signal used for transmitting data includes receiving an output optical signal from an optical fiber. A state-of-polarization (SOP) of the input optical signal to the optical fiber is periodically modified by a Jones matrix switch prior to transmission over the optical fiber so as to have at least two different polarization states. The SOP of the received optical signal is measured as a function of wavelength for the different transmitted polarization states. A wavelength dependent polarization and phase correction to the polarization and phase of the output signal is determined so that the so that the polarization state becomes frequency independent. The computed corrections are used to modify the received signal in a pulse shaper.

In another aspect, a method of transmitting an optical signal includes accepting an optical signal modulated at a data rate; and, periodically modifying the state-of polarization (SOP) of the optical signal into a plurality of polarization states using a polarization transfer matrix switch. The optical signal having a sequence of polarization states is coupled to an optical transmission device. The rate of switching the polarization transfer switch is substantially lower than a data rate of the data to be transmitted on the optical signal.

A computer program product having instructions, stored on a machine readable medium, is described. The instructions configure a computer to receive a measurement output of a polarimeter, measuring a received signal from a transmission system, and to determine a first wavelength-dependent Jones matrix characterizing the transmission system, wherein a state of polarization of the received optical signal has been modified in a periodic manner to at least two states of polarization prior to transmission. A second wavelength dependent Jones matrix is computed such that a third Jones matrix being the concatenation of the first Jones matrix and the second Jones matrix is a frequency independent Jones matrix. The computer is further configured to control a pulse shaper capable of modifying a polarization of a received optical signal based on the second Jones matrix on a wavelength dependent basis.

DESCRIPTION

Exemplary embodiments may be better understood with reference to the drawings, but these examples are not intended to be of a limiting nature. Like numbered elements in the same or different drawings perform equivalent functions. When a specific feature, structure, or characteristic is described in connection with an example, it will be understood that one skilled in the art may effect such feature, structure, or characteristic in connection with other examples, whether or not explicitly stated herein. Embodiments of this invention may be implemented in hardware, firmware, software, or any combination thereof, and may include instructions stored on a machine-readable medium, which may be read and executed by one or more processors.

Optical components may be discrete, as in bulk optics components, or incorporated as functions in integrated modules. Light propagation may be in free space, or waveguide constrained, where the constraining means includes optical fiber, planar waveguides, arrayed wavelength gratings (AWG), dispersive media, or the like. The descriptions herein generally use the laboratory apparatus for the experiments described, however such equipment descriptions are not meant to be limiting.

In the interest of clarity, not all the routine features of the implementations described herein are described. It will of course be appreciated that in the development of any such actual implementation, numerous implementation-specific decisions must be made to achieve a developers' specific goals, such as compliance with system and business related constraints, and that these goals will vary from one implementation to another. Moreover, it will be appreciated that such a development effort might be complex and time-consuming, but would nevertheless be a routine undertaking of engineering for those of ordinary skill in the art having the benefit of this disclosure.

There are a variety of mathematical schemas used to characterize the polarization properties of an electromagnetic signal, and the description herein could have equally been presented in any of a variety of such systems. Therefore the use of such constructs as a Poincare sphere, Stokes parameters, Jones matrix, polarization transfer switch, and the like is not intended to be a limitation on the scope of the subject matter described herein. The terms frequency-dependent and wavelength-dependent are sometimes used to describe characteristics of the optical signals, transmission media, or devices, and a person of ordinary skill in the art will understand that these are equivalent ways of describing the characteristics, the frequency and wavelength being inversely proportional to each other. Similarly, optical signals, lightwave signals and the like, are used generally without intending to distinguish between the usage.

Figure 1:
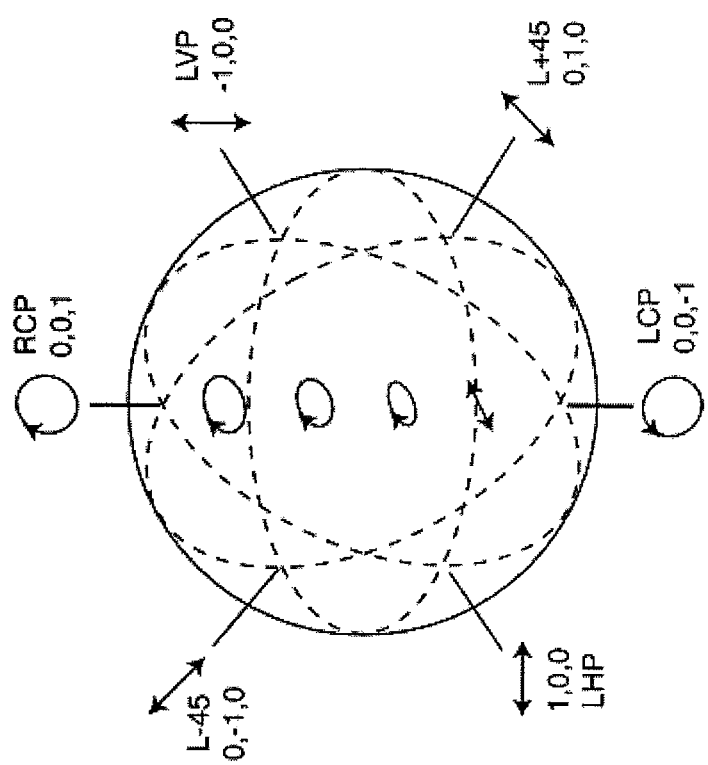
FIG. 1 illustrates the relationship of the Poincare sphere to the Stokes vectors, showing the principal states of polarization along the orthogonal axes and elliptical polarization elsewhere.

The polarization properties of an optical signal may be described as a vector combination of two orthogonal signals, where the amplitude and relative phase of the signals produces a linear, circular, or elliptically polarized result. One way of visualizing the signal is a Poincare sphere and Stokes coordinate system as shown in FIG. 1. The orthogonal axis system represents linear horizontal and vertical polarizations, slant 45° polarizations, and right and left hand circular polarizations along the positive and negative principal axes, and elliptical polarization, with varying ellipticity, for the vector space that is off-axis. The state of polarization (SOP) of a signal may be represented by a point on the sphere, and the SOP may be shown, for example, as a function of time, or of wavelength. In the present discussion, the SOP of a light signal will be shown as a function of wavelength at a particular epoch.

In an aspect, polarized light may be represented as a Jones vector, $$\begin{pmatrix} E_x(t) \\ E_y(t) \end{pmatrix},$$

where $E_x(t)$ and $E_y(t)$ are the transverse x and y components of the electric field of the light wave. Passive optical elements may be characterized based on their effect on the polarization of an optical signal passing therethrough, so that the effects of optical elements such as a quarter wave plate, a half wave plate, a polarizer, or the like may be represented by a Jones matrix multiplication operation.

Figure 2:
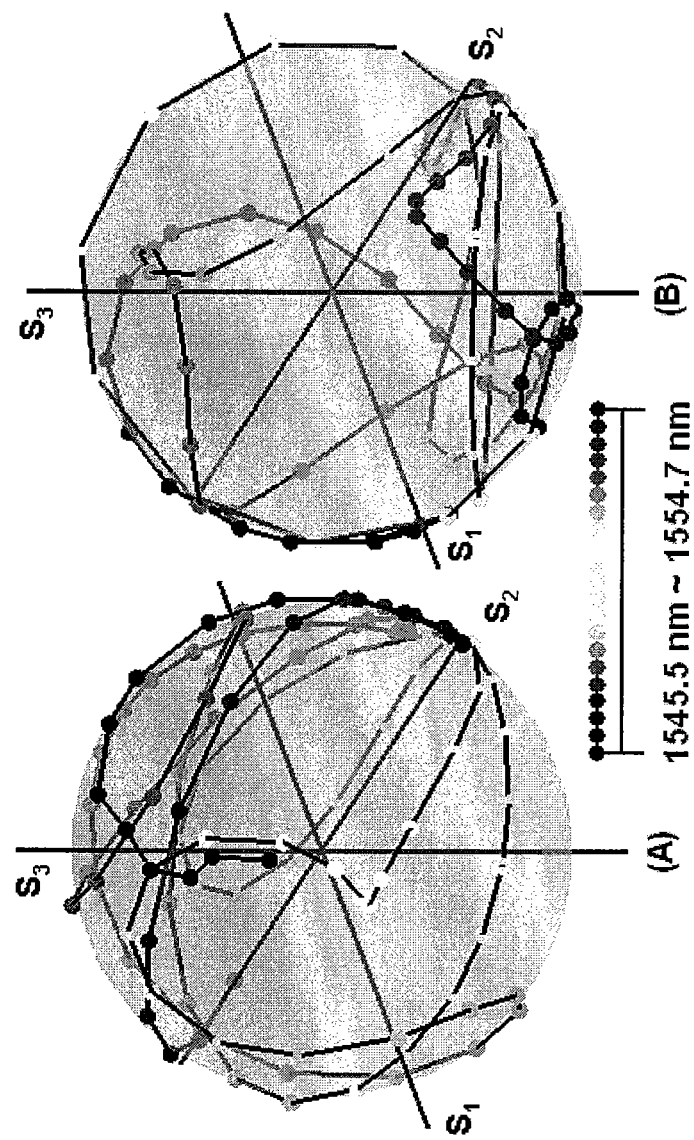
FIG. 2 is a Poincare sphere representation showing the effect of polarization-mode-dispersion of an 800 fs optical pulse passed through a PMD simulator with a mean differential group delay (DGD) of about 5.5 ps.

FIG. 2 shows the effect of polarization-mode-dispersion of an 800 fs optical pulse passed through a PMD simulator with a mean differential group delay (DGD) of about 5.5 ps. The points on the surface of the Poincare sphere represent the frequency-dependent SOP of the signal over a frequency range of about 1.2 THz at a central wavelength of about 1549.6 nm. FIG. 2A shows the results which obtain when the input SOP is linear, and FIG. 2B shows the results which obtain when the input SOP is right hand circular (RHC). To obtain this data, the input states of polarization were wavelength independent, and the input state of polarization at the transmission end of the system corresponding to each of the wavelength-dependent polarization plots of the output data shown in FIG. 2 would be a single point on the Poincare sphere. This illustrates that the output SOP depends on the input SOP to the PMD simulator, where the PMD simulator represents the transmission system. As such, a single wavelength-independent compensation would not be effective in correcting PMD.

The Jones matrix characterization of an optical path (excluding the isotropic chromatic dispersion and losses) can be written as:

$$U_f = \begin{bmatrix} \cos\theta e^{j\phi} & \sin\theta e^{j\psi} \\ -\sin\theta e^{-j\psi} & \cos\theta e^{-j\phi} \end{bmatrix}, \quad (1)$$

where $\theta$, $\phi$ and $\psi$ are frequency dependent angles. The Jones matrix itself is independent of the input polarization and represents the characteristics of the physical system; however output polarization of a signal transmitted through the system depends on the input polarization through the Jones matrix transformation. By measuring the output state-of-polarization (output SOP) corresponding to 0° linear and 45° linear input states of polarization (input SOP) to a device or optical path, one can determine $\theta$, $\phi$ and $\psi$ as a function of frequency. PMD may be associated with the wavelength dependence of the Jones matrix and wavelength-dependent compensation of the PMD can be achieved by correcting the Jones matrix to a constant, wavelength-independent matrix. Where the term wavelength independent is used, a person of skill in the art would recognize that the ability to render the resultant signal wavelength independent is influenced by measurement errors such as due to signal-to noise ratio, bandwidth resolution of the polarization measurements, the rate of temporal change of the system characteristics, and the like.

The wavelength dependence of the Jones matrix, may be characterized by sequentially transforming an arbitrary input SOP from an optical source or modulator to at least two different SOPs, launching the optical signal into the fiber link, and measuring the output SOP as a function of wavelength. In the experiments described herein, four states of a polarization transfer (Jones matrix) switch were used.

At the receiving end of the transmission path (simulated by passing the optical signal through the PMD simulator), two output SOP wavelength-dependent polarization spectra whose relative angle is closest to 90° on the Poincare sphere are selected. By associating one of the selected output SOP spectra with a 0° linear input SOP, and the normalized cross product of the two selected output SOPs with a 45° linear input SOP, a correction matrix to the wavelength-dependent Jones matrix $U'_f = U_f U$, is obtained, where U is a frequency independent matrix and $U^{-1}$ would transform one of the selected SOPs to a 0° linear state and the normalized cross product of the two selected SOPs to a 45° linear state. The effect of noise on the measurement of the cross product is reduced when the angle between the two selected to be approximately 90°, although relative angles of between 60° and 120° may be used.

The inverse of $$U'_f \left( U'_f = \begin{bmatrix} \cos\theta' e^{j\phi'} & \sin\theta' e^{j\psi'} \\ -\sin\theta' e^{-j\psi'} & \cos\theta' e^{-j\phi'} \end{bmatrix} \right)$$

can be written as the product of three rotation matrices, as, $$(U'_f)^{-1} = \begin{bmatrix} \exp(-j\theta_3) & 0 \\ 0 & \exp(j\theta_3) \end{bmatrix} \begin{bmatrix} \cos\theta_2 & -j\sin\theta \\ -j\sin\theta_2 & \cos\theta_2 \end{bmatrix} \quad (2)$$

$$\begin{bmatrix} \exp(-j\theta_1) & 0 \\ 0 & \exp(j\theta_1) \end{bmatrix},$$

where, $\theta_1 = (\phi' + \psi')/2 + \pi/4$, $\theta_2 = -\theta'$, and $\theta_3 = (\phi' - \psi')/2 - \pi/4$ and each of these angles is wavelength dependent. To achieve wavelength-by-wavelength Jones matrix correction, the optical frequency components of the received signal are spatially dispersed in a pulse shaping configuration so that small wavelength intervals within the signal bandwidth may be individually corrected and then recombined.

A 4-layer liquid crystal modulator array (LCM) as the spatial light modulator (SLM) may be used to realize the three elementary rotation matrices of equation (2), which allows full compensation of the PMD in a single pulse shaper apparatus. Formally, the adjustments effected by each wavelength resolution element of the SLM can be expressed as a polarization transfer matrix M. Because a dispersive module maps different optical wavelength components onto the different pixels of SLM the effective polarization transfer matrix of the SLM becomes frequency dependent, $M(\omega)$. The electric field $E_{adjusted}(\omega)$ of adjusted optical signal following transmission through a compensation system can be expressed as:

$$E_{adjusted}(\omega) = M(\omega) \cdot E_{out}(\omega) \quad (3)$$

where $E_{out}(\omega)$ is the electric field vector of the PMD-distorted lightwave signal. Matrix M is a 2-by-2 Hermitian matrix; it has four degrees of freedom and its elements may take on complex values. When each pixel of SLM independently controls all four degrees of freedom of the polarization transfer matrix, the SLM can independently control the SOP, or phase of the spatially dispersed frequency components, and thereby completely compensate for the wavelength-dependent polarization effects imparted by optical system. Even when the pixels of the SLM control less than all four of the degrees of the polarization transfer matrix, the distortions caused by optical system can be reduced, if not completely compensated. Both the SOP and the phase or only the SOP may be corrected.

Each LCM layer of an SLM functions as a linear retarder array having, for example, 128 active regions with a fixed fast axis and arbitrarily adjustable retardance in the slow axis. The orientations of the fast axis of each of the four LCM layers may be 0°, 45°, 0°, and 90°, respectively with respect to a reference direction perpendicular to the light path. The first three layers (0°, −45°, −0°) may be operated to produce the three elementary rotation matrices on the right side of Eq (2). After that operation, an isotropic residual spectral phase of $-(\theta_1 + \theta_2 + \theta_3)$ remains, which may be considered an isotropic or chromatic phase and which may include any residual chromatic dispersion not otherwise compensated.

The third and fourth LCM layers may be programmed in a common-mode configuration to have a value opposite of the residual phase, thus removing the remaining isotropic phase, and the phase of the third LCM layer may also be programmed according to the superposition of this isotropic phase and the appropriate rotation matrix. After such Jones-matrix-related correction, PMD effects are compensated to all orders within the wavelength resolution of the device. The output Jones vector after PMD compensation is a wavelength-independent transformation of the input signal Jones vector, $\vec{E}_{out} = U^{-1} \vec{E}_{in}$.

The output signal, compensated so as to remove the effects of the transmission path, would appear on a Poincare sphere as a set of discrete output SOPs corresponding to the original input stats of polarization at the transmitter end of the fiber, and having a corrected wavelength dependence which minimizes the effects of PMD. At his juncture, the signal may be detected by a photo-detector, processed by other optical techniques at the receiving end, or retransmitted without the need to use a further sending-end Jones matrix switch following the compensation.

Figure 3:
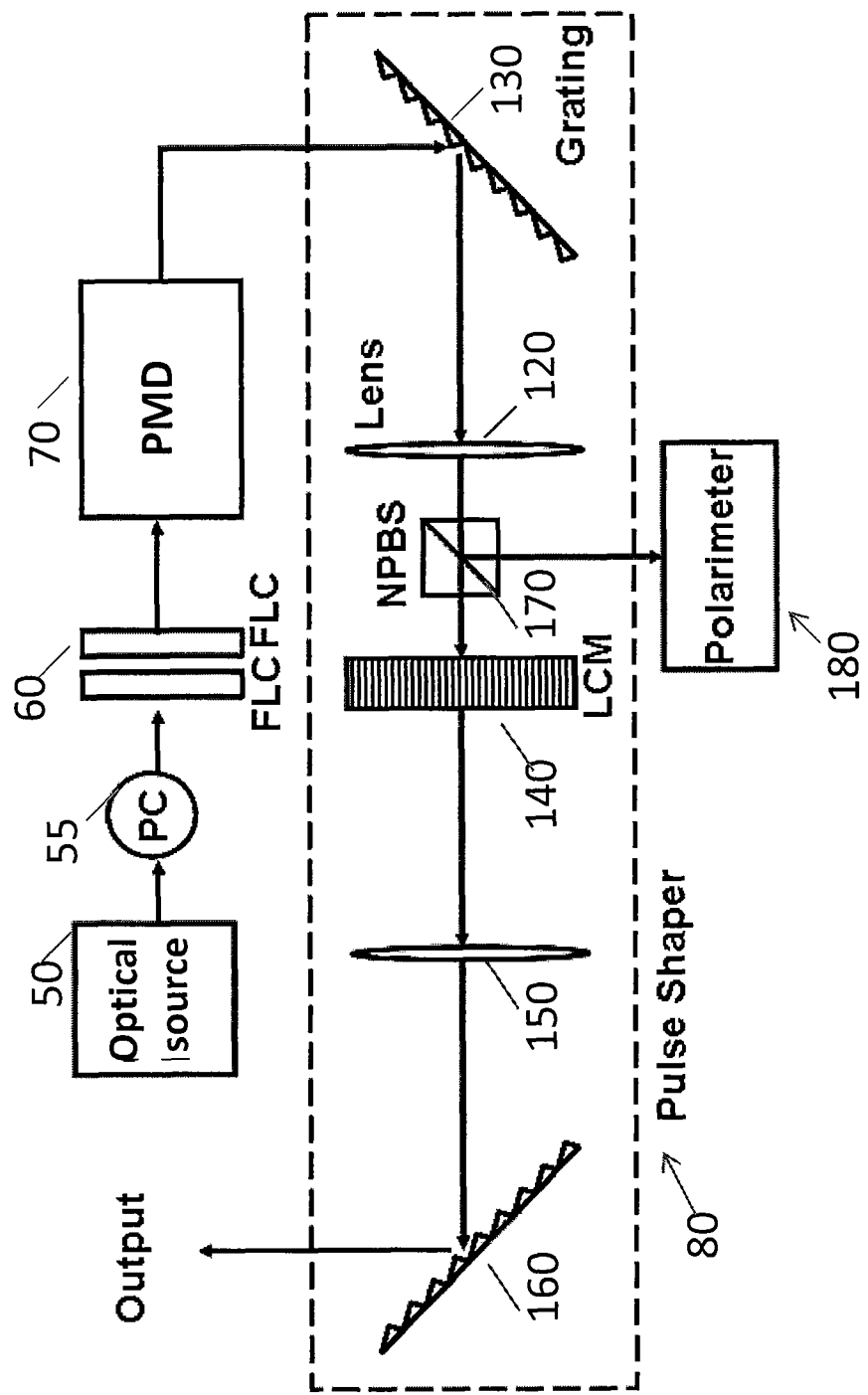
FIG. 3 is a block diagram of an experimental example of correction of polarization mode distortion according to an embodiment.

In an example, the correction of PMD was demonstrated using the experimental apparatus of FIG. 3. A passively-mode-locked fiber-ring-laser 50 was followed by a bandpass filter (~4 nm full width at half maximum (FWHM)) and is used as an optical source to produce ~800 fs optical pulses with a 50 MHz repetition rate and a 1550 nm central wavelength. A polarization controller 55 was used in some experiments to rotate the plane of polarization of the pulse signal so as to achieve a variety of input SOPs to the remainder of the apparatus. Polarization controller 55 may be used to simulate a transmitting system where the optical signal source was connected to the Jones matrix switch by a length of single mode fiber, or other optical components such as a WDM, and where the SOP of the signal at the input to the optical fiber would not be controlled so as to be known a priori, and could also vary with time due to, for example, environmental factors.

A pair of ferroelectric liquid crystal (FLC) retarders (Displaytech, Longmont, Colo.) was used to switch the input SOP amongst four states of a Jones matrix (polarization transfer) switch 60.

A PMD simulation 70 module was constructed from a plurality of short lengths of polarization maintaining (PM) fibers, where the fiber lengths and relative angular rotations were selected to yield a mean differential group delay of about 5.5 ps. This module and similar modules were used to simulate the effects of propagation along a long length of single mode optical fiber, where the overall transmission characteristic may be characterized by a wavelength dependent Jones matrix.

The light output from the PMD simulation module 70 was connected to a fiber-pigtailed grating-based pulse shaper 80 for correcting the optical signal based on the measured wavelength-dependent polarization characteristics. A pulse shaper, or compensation system 80, such as that described in U.S. Pat. No. 7,369,773, issued to one of the present inventors, and incorporated herein by reference, includes a first dispersive module 130, a spatial light modulator (SLM) 140, a controller (not shown) coupled to spatial light modulator 140, and a second dispersive module 160. The dispersive module 130 spatially separates the optical signal into wavelength-dependent components and directs the spatially separated components onto the active areas of a light modulator, which may be a liquid crystal modulator 140. In this manner, a particular wavelength range is associated with an independently controllable active area of the LC modulator 140. In the present apparatus, each active area is a liquid crystal stripe. However, in a two-dimensional spatial dispersion pulse shaper, each active area may be equivalent of a pixel.

A controller causes a spatial light modulator (SLM) 140 to independently adjust one or more properties of the spatially-separated wavelength components to produce PMD-compensated wavelength components. The dispersive module 160 then spatially recombines the adjusted wavelength components to produce a compensated lightwave signal, which may be coupled out of the pulse shaper 80 as a beam which may propagate in a fiber. The effect of the compensation system is to reduce the distortions in the lightwave signal caused by the transmission system (represented here by the PMD simulator 70 and polarization controller 55). In a telecommunications system, the transmission system may include an optical fiber, and interface equipment which may include frequency division multiplexers (FDM), add-drop multiplexers, fixed dispersion compensators, optical routing switches, and the like.

The modules 130 and 160 may include dispersive elements for spatially separating or combining wavelength components. For example, the modules may include a diffraction grating (e.g., a reflective grating, transmissive grating, an amplitude grating, a phase grating, a holographic grating, echelle grating, arrayed-waveguide grating, or the like), a chromatic prism, and/or a virtually imaged phased array (VIPA). The dispersive modules may further include one or more imaging optics components 120, 150 (e.g., lenses, mirrors, apertures, etc.) for directing the frequency components that have been spatially separated by the dispersive element in module 130 onto the LCM 140, and for directing the adjusted wavelength components from SLM 140 to the dispersive element in module 160. In an aspect, the dispersive modules can be a single optical element that combines the dispersing and directing functions, e.g., the dispersive module can be a diffractive optical element (DOE).

The term "pulse shaper", as used herein, is intended to connote an ability to modify the spectral properties of a broadband optical signal. The optical signal may be spread over an optical bandwidth by on-off pulse modulation, phase modulation, amplitude modulation, or a combination of such modulation techniques. The pulse shaper 80 is representative of devices that can process such broadband signals and modify the properties selectable wavelength regions of the signal. The examples shown herein are for optical pulses, as such pulses and the distortion effects thereon are familiar to persons of skill in the art, and the effect of the apparatus and method described herein would be more easily understood. A constant amplitude signal having an equivalent bandwidth could equivalently be processed.

The spatial light modulator 140 (SLM) may be a liquid crystal modulator (LCM) and may include at least one liquid crystal layer. For example, the SLM may include four liquid crystal (LC) layers, wherein the LC molecules in each of the LC layers are oriented along an axis, and wherein the axis for each of the LC layers may be different from the axis of another of the adjacent LC layers. In some embodiments, the axes may differ from one another by an absolute amount of about 45° or a multiple thereof. The number of active elements in the modulator, and the spatial distribution of the elements depend on the specific design of the compensation module, and the wavelength range to be compensated.

At present, the use of SLM which is an LCD is convenient due to the state of development of the apparatus, however, a SLM may use other materials and construction, including, for example, ferro-optoelectric materials, such as lithium niobate, optically active polymers, or the like, having the same or similar effect.

Figure 6:
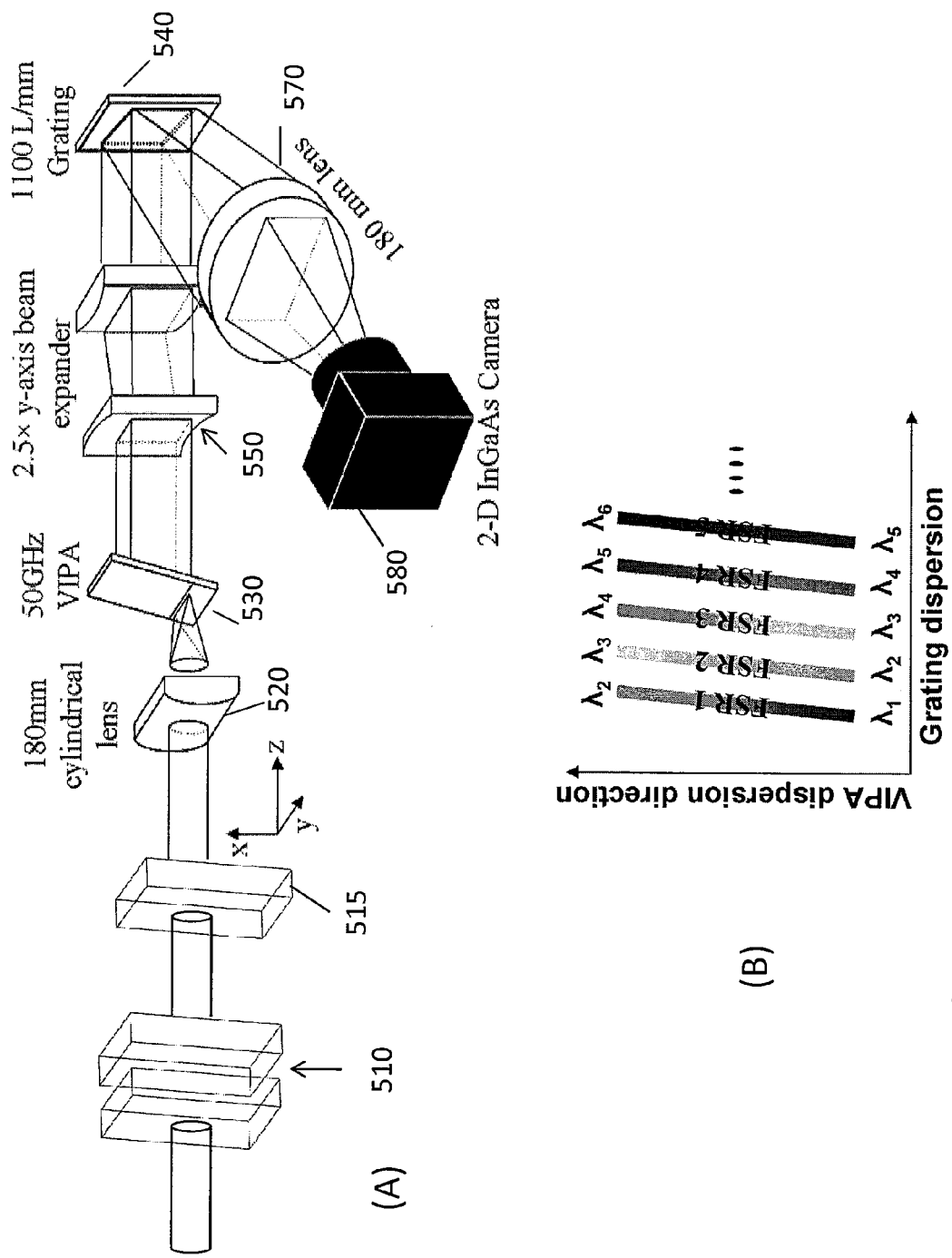
FIG. 6 shows simplified block diagram of a wavelength-parallel polarimeter.

The specific correction to be applied to each of the wavelength components is determined by measurements made using a polarimeter. In the experimental data described herein a grating-based wavelength-parallel polarimeter was used. Another configuration of wavelength-parallel polarimeter having a VIPA dispersive element is shown in FIG. 6; see, for example, U.S. Pat. No. 7,166,419, issued to one of the present inventors, and incorporated herein by reference). A non-polarizing beam splitter 170 (NPBS) may direct a fraction of the light to the polarimeter 180 for SOP sensing. The beamsplitter 170 may be integrated into the compensation module 80, as shown, so as to use the input dispersive module 130 to spatially separate the input signal for the purposes of polarization measurement as well as the purpose of applying the corrections of the correction module.

Alternatively, the sample of the light which is to be measured by the polarimeter may be obtained by a beamsplitter located prior to the input of the pulse shaper 80. The beamsplitter may be any of the techniques that are capable of obtaining a sample of the signal output from the transmission system, and may include partial mirrors, prisms, directional couplers and the like which may be implemented in bulk optics, integrated optical module, optical fiber, or the like, or a combination thereof.

Temporal profiles of pulses before and after PMD compensation may be measured by, for example, an intensity cross-correlation technique. In the examples shown, the overall chromatic dispersion of the entire apparatus was pre-compensated.

The input SOP prior to the Jones matrix switch 60, may be arbitrary so as long as the input SOP is substantially constant during each measurement cycle. A Jones matrix (polarization) switch may be comprised of a plurality of FLC retarders. Each FLC may be configured to act as a quarter-wave retarder at 1550 nm and may have two stable optic-axis orientations separated by approximately 45°. The switching time of the present Jones matrix switch is about 70 µs. The orientations of the axes of the two FLCs were 0° (state 0), −45° (state 1), and 45° (state 0), −90° (state 1). The SOP transformations may be denoted by the combination of the states of the FLCs as 00, 01, 10, and 11.

While a light source 50 such as a laser may be strongly polarized, the light may be transmitted between the laser, a data modulator, and the Jones matrix switch using single mode (non-polarization maintaining fiber) and the state of polarization SOP at the input to the Jones matrix switch may vary depending on the optical components disposed between the light source 50 and the Jones matrix switch 60 and may also vary with time due to environmental effects, such as temperature, and stress. The Jones matrix switching rate and the update rate of the polarimeter are selected to be sufficiently rapid such that the measurements made represent the temporal dependence of the PMD of the transmission system. This may permit the combination of a plurality of individual modulated optical central frequencies to be combined in a wavelength division multiplexer (WDM) prior to the Jones matrix switch.

Under such circumstances, where four Jones matrix switch states are configured, having approximately orthogonal properties on the Poincare sphere, numerical simulation studies have shown that that, for any input SOP to the Jones matrix switch, there are at least two Jones matrix switch states yielding SOPs at the output from the transmission system (here simulated by the PMD simulator 70) separated by an angle in the range between 60° and 120° on the Poincare sphere.

The output light of the optical fiber (or PMD simulator 70) is connected to a fiber-pigtailed pulse shaper incorporating SLM which is a four-layer liquid-crystal modulator (LCM). This LCM is presently a laboratory device, specially fabricated by CRI Inc. (Woburn, Mass.). A commercial two-layer version is available, of which two were packaged together to form the apparatus used. A multilayer LCM array is described in U.S. Pat. No. 5,719,650, to Wefers et al., which is incorporated herein by reference.

Figure 4:
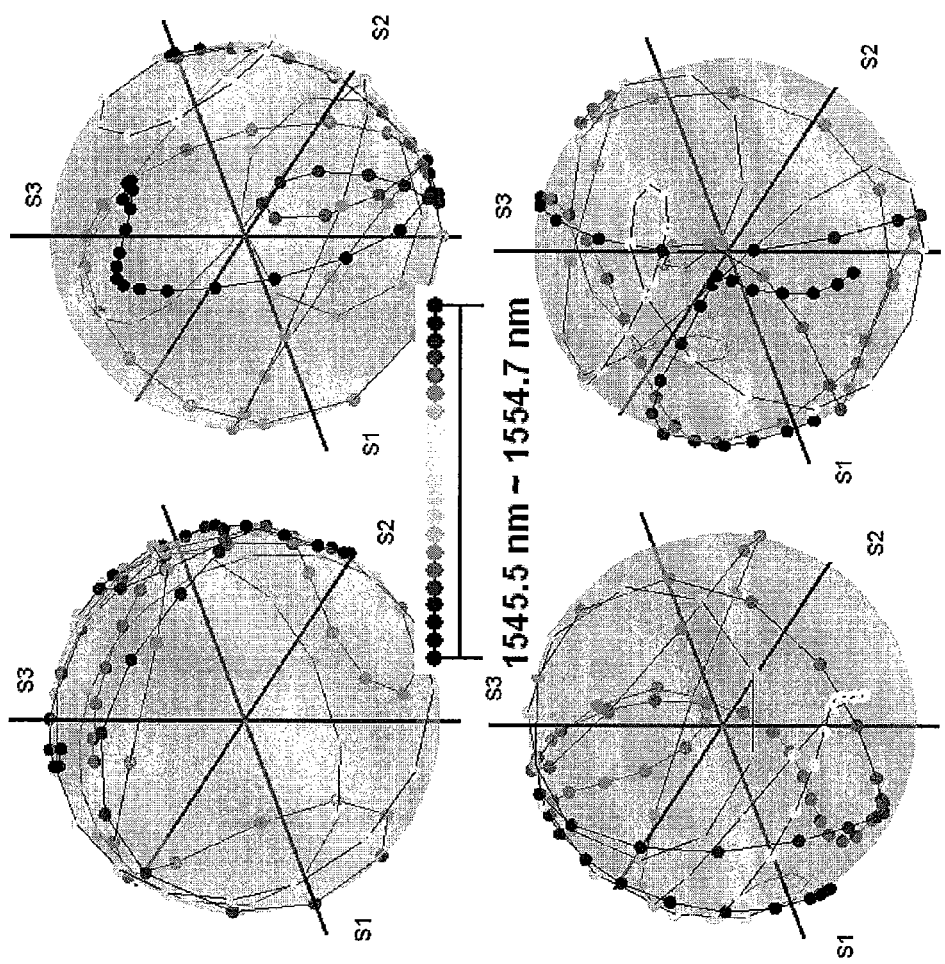
FIG. 4 is a Poincare sphere representation of PMD simulator output SOP spectra corresponding to the 4 FLC states 00, 01, 10, and 11 over a spectrum range is 1545.5-1554.7 nm, and each point corresponds to a measured SOP vector at a specified wavelength.

FIG. 4 shows an example of four Poincare sphere plots (corresponding to the four states of the Jones matrix switch used in the experiment) of the wavelength dependence of the SOP when distorted by the PMD of the simulator. Each dot on the sphere represents a wavelength that has been measured at an equally-spaced interval in the wavelength domain, and adjacent wavelength measurements for the same input SOP are connected by lines. The strong wavelength-dependent variation of the output SOPs is indicative of significant all-order PMD effects. That is, the PMD characteristic has a wavelength dependence which, if described in a power series expansion, would have more than a constant and a linear term, and the higher order terms may have significant effects.

The average measured angles between data from FLC states 00-01, 00-10, 00-11, 01-10, 01-11, and 10-11 were computed as 89.2°, 107.9°, 107.2°, 159.4°, 108.9°, and 59.0°. Data from 00-01 states, having an average angle difference of 89.2°, was selected for control of the PMD compensator.

The PMD distorted signal was launched into a grating-based transmission-type pulse shaper incorporating the 4-layer LCM as the SLM for PMD compensation. Each LCM layer functions as a linear retarder array (128 independently addressable pixels) with a specified fast axis and adjustable slow axis retardance. The retardance is controlled by a voltage applied to each stripe of each layer of the LCM, and is determined by a computer, which may be a microprocessor.

Figure 5:
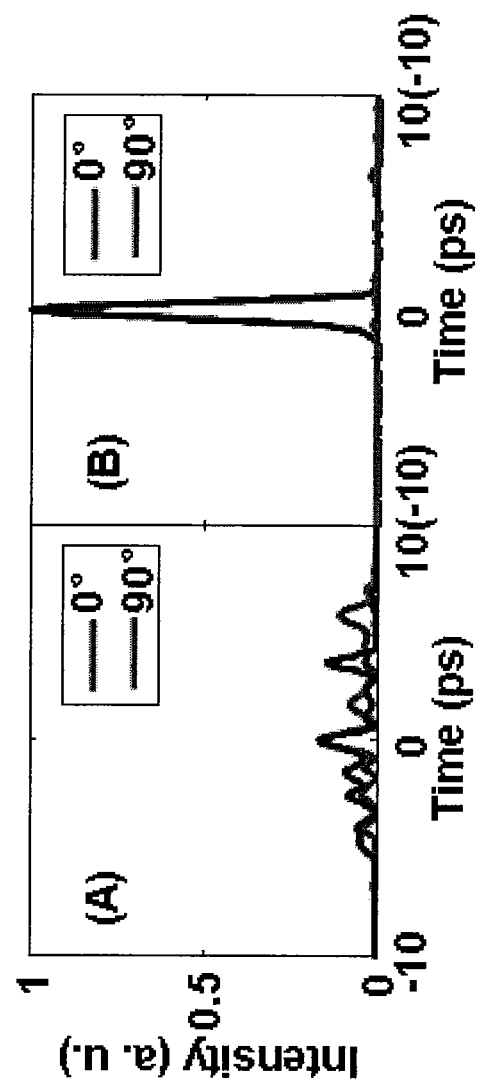
FIG. 5 shows (A) the output pulses for two fixed states of polarization at the input of the PMD simulator and (B), the pulses for the two fixed states of polarization after correction for PMD as described herein.

FIGS. 5A and 5B show the PMD distorted pulses and the restored pulses after PMD compensation, respectively. Temporal profiles of pulses before and after PMD compensation were measured using an intensity cross correlation technique. Since the PMD-distorted pulses are input-polarization dependent, the temporal intensity profiles of the pulses were measured at two orthogonal input polarization states (0° and 90° linear) selected by a polarizer. During this portion of the experiment, the FLC retarders of the Jones matrix switch 70 at the transmission end were stable (00 state).

The peak intensity of the restored pulse at 0° linear SOP is normalized to 1. After compensation, the pulse has been compressed from more than 10 ps (10% intensity) to 826 fs full-width at half maximum (FWHM). The output SOP of state 00 is corrected to 0° linear state at the output of the pulse shaper, as predicted in theory. Similar results were obtained for other Jones matrix switching states where the average angle differences were between 60° and 120°.

The same experiment was repeated with more than 20 independent PMD profiles and input SOPs to the Jones matrix switch. Each time, the pulses were compressed to about 800 fs duration after PMD compensation.

The PMD compensation apparatus is compatible with simultaneous real-time sensing and compensation. To demonstrate this, the intensity profiles of the restored pulses were measured while switching states of the Jones matrix at a rate of up to 2000 Hz during the experiments. No significant change in the restored pulse width was observed. The value of 2000 Hz was chosen for experimental convenience and is not meant to be a limitation.

An example of a wavelength-parallel polarimeter shown in FIG. 6A, where a first stage is a polarization component selector, having of a pair of fast-switching ferroelectric liquid crystal (FLC) retarders 510 and a polarizer 515. The FLCs were anti-reflection coated, and had a fixed quarter-wave phase retardation for 1550 nm light. The fast optical axis of the first FLC was switched between 90° and 135°, the fast optical axis of the second FLC was switched between 135° and 180°, and the polarizer was fixed at horizontal (0°). The FLC pair and the polarizer were used to sequentially transform the SOP of the analyzed light, permitting determination of four polarization components of the light under being measured. With the knowledge of these four polarization components, the polarization Stokes parameters of the light can be found.

In the second stage of the polarimeter 180, the light is wavelength dispersed onto a photo-detector array for wavelength-parallel operation. High spectral resolution over a broad bandwidth may be obtained by using a 2-D spectral dispersion geometry in a virtually-imaged phased array and a diffraction grating. The light beam is focused onto a VIPA 530 (Avanex, Freemont, Calif.) by a cylindrical lens 520. The VIPA has a free spectral range (FSR), thus spectrally periodically dispersing segments of the bandwidth in an x-direction. A diffraction grating 540 is placed so as to spatially separate the FSRs of the VIPA in a y-direction. In order to improve FSR isolations, a beam expander 550 may be inserted prior to the grating 540 to increase the beam width at the grating so as to result in higher spectral resolution in the grating dispersion direction. A lens 570 may direct the two-dimensional spectral patterns onto photodetector 580, which may be a camera having an InGaAs detector array (such as the Indigo Alpha NIR™, Photon, San Jose, Calif.). The signal intensities measured by the camera may be communicated to a computer or controller (not shown) that analyzes the data to compute the required wavelength-dependent Stokes parameters. FIG. 6B shows schematically a representation of the 2D image which would be formed on the detector array of the camera 580, where the spectrum is segmented in intervals corresponding to the FSR of the VIPA 530, and the intensity represents the signal strength as a function of wavelength.

Other types of polarimeter may be used depending on the response time, resolution, and bandwidth of the system for which they are intended. Such polarimeters may, for example, measure the properties of the signal in a wavelength-sequential manner, or may sample the wavelength spectrum.

Similarly to the use of two-dimensional spectral dispersal for polarimetry, an optical signal whose PMD is to be compensated could dispersed in two-dimensions in the pulse shaper so as to either increase the spectral resolution of the compensation or to increase the bandwidth over which PMD compensation can be provided using a single apparatus. Such wide-bandwidth uses may be compatible with the concept of wavelength division multiplexing (WDM) where a plurality of optical signals, each having a different central wavelength, are modulated with data, optically multiplexed, and transmitted over the same optical fiber.

The composite optical signal at the transmitting end may be processed in the Jones matrix switch as described above at the sending end, and a polarimeter and pulse shaper may be used to process the received optical signal at the receiving end before the received optical signal is separated into the individual WDM channels for further processing.

The pulse shaper may be a two dimensional LCD array, having a pixilated construction, so as to individually compensate each wavelength interval in the two-dimensionally-dispersed spectrum. Gaps in the wavelength coverage may correspond to guard bands between the individual WDM channels.

Figure 7:
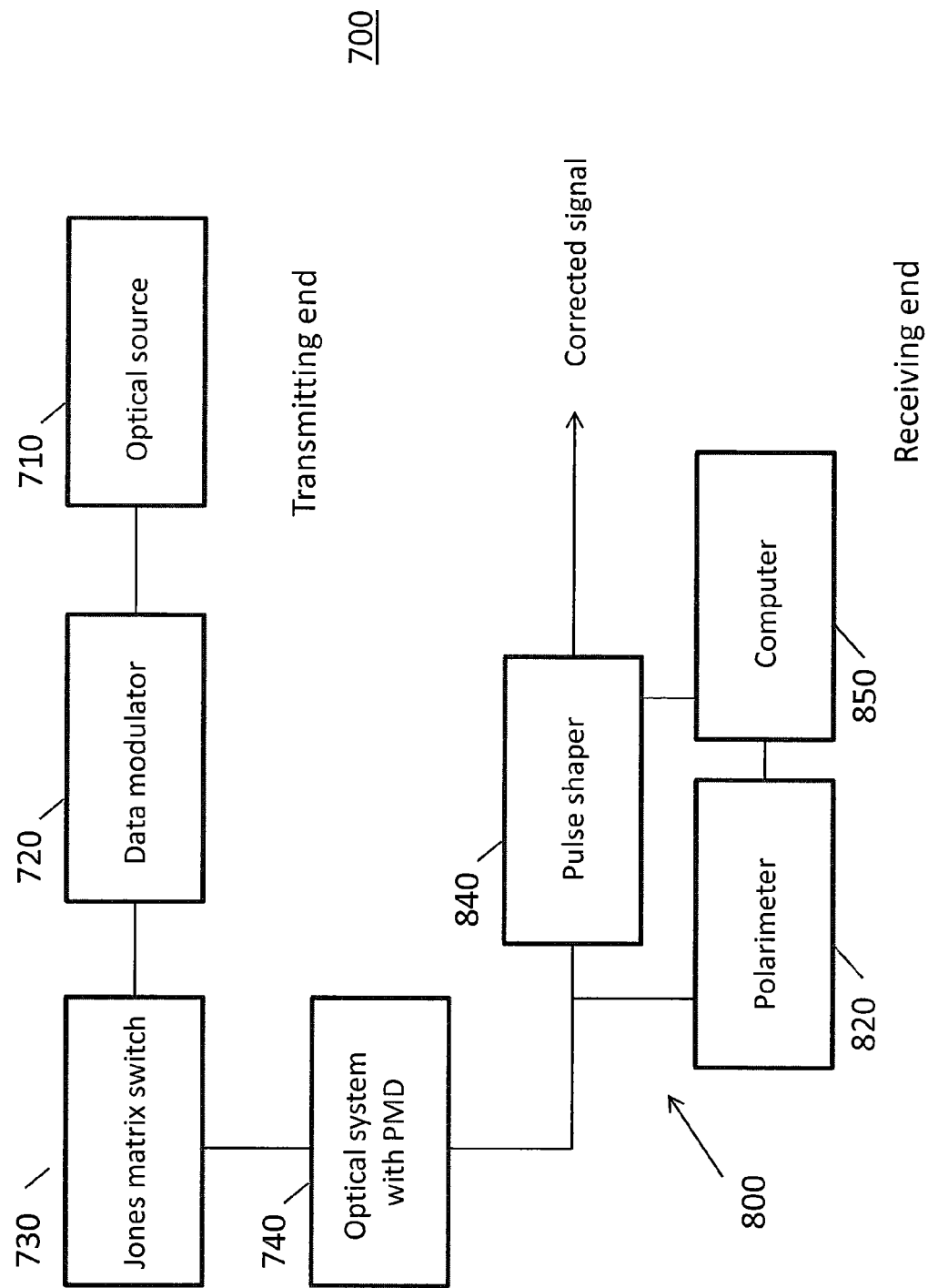
FIG. 7 shows a block diagram of an optical telecommunications system with PMD correction capability.

The concepts described above may be used in an optical telecommunications or sensing system to correct for polarization distortions, such as polarization mode distortion (PMD) occurring in the fiber, or in other components of the optical system. FIG. 7 shows a block diagram of an optical telecommunications system 700 having an optical source 710, which may be, for example a semiconductor laser or fiber laser. The light is modulated with a signal representing the data information content to be transmitted from the transmitting end to the receiving end. The signal may be amplitude or phase modulated onto the optical source signal in a modulator 720, which may be an integrated optics device using interferometric or other techniques, an absorptive modulator, a switch, or the like, and routed through a Jones matrix switch 730, to periodically modify the polarization state of the signal at the input to the optical fiber transmission system 740. The optical fiber transmission system 740 may have one or more components exhibiting PMD.

The multiple-polarization-state modulated signal output from the Jones matrix switch 730 may be coupled directly to an optical fiber at a proximal end, or may be coupled to the fiber through ancillary terminal equipment such as a wavelength division multiplexer (WDM) or other interface equipment (not shown), as is known in the art. At the distal end of the telecommunications link path where the optical signal is to be recovered, the optical signal output from the fiber or the distal-end WDM equipment may be coupled to the PMD compensator 800.

The PMD compensator may include a pulse shaper 840, which may be a grating based pulse shaper similar to that described above, a VIPA based pulse shaper, or any apparatus capable of performing a polarization transfer matrix operation on an optical signal on a wavelength-dependent basis. A sample of the received signal is also routed to a polarimeter 820, to measure the wavelength-dependent state-of-polarization (SOP) of the received signal. The coupling of the signal to the polarimeter may be by a prism, a partially reflecting surface, a directional coupler or similar device (not shown).

The wavelength-dependent Stokes parameters obtained by the polarimeter may be used to compute the corrections to the Jones matrix so as to render it wavelength independent over the bandwidth being compensated. The compensation computation is performed by a computer or controller 850 executing stored instructions to configure the computer 850 to receive the output of the polarimeter 820 and to control the pulse shaper 840, the pulse shaper having wavelength dispersing modules and a spatial light modulator operable to apply a correction to the signal on a wavelength-by-wavelength basis, with a resolution consistent with the remainder of the system design. After being initialized, the variation in PMD may be continually compensated using the output of the polarimeter to adjust the parameters for correcting the Jones matrix to a frequency independent state and controlling the pulse shaper accordingly, as the changes in PMD, and any polarization changes at the input to the Jones matrix switch at the transmitting end or in the transmission system are slow with respect to the Jones matrix switching rate.

The resultant compensated optical output will have a polarization state corresponding to the polarization states that were imposed on the signal at the sending end. However, the polarization states will be substantially independent of the effects of PDM associated with the transmission path. If the state of polarization at the input to the Jones matrix switch at the transmitting end is controllable, similar results may be obtainable using only two orthogonal states of the Jones matrix switch. If such a PMD-compensated signal were to be displayed in a Poincare sphere, the wavelength-dependent polarization characteristic of the output of the transmission system would not be observed, as the polarizations would be collapsed into the same number of discrete polarizations as were imposed on the signal by the Jones matrix switch at the transmitting end.

A method of correcting for polarization mode distortion (PMD) comprises the steps of: using a Jones matrix polarization state switch to modify the polarization state of a transmitted signal in a known sequence of states; coupling the output of the Jones matrix switch to an optical transmission system, which may be a fiber optic telecommunications system; and, coupling the output of the optical transmission at the receiving end of the system path to a polarization mode dispersion compensator.

In an aspect, the polarization mode dispersion compensator performs the steps of coupling a portion of the output signal to a polarimeter where the wavelength-dependent state of polarization (SOP) is measured for each of at least two states of polarization of the transmitted signal. A further step of selecting the two SOP measurements corresponding to transmitted polarization states and having a difference angle on the Poincare sphere closest to 90° and, at each wavelength, the step of computing the cross product of the two selected SOP data sets is performed. One of the two selected SOPs is associated with the output SOP for 0° linear input, and the cross product is associated with the output SOP for slant 45° linear input. The SOP data are used to compute a wavelength-dependent Jones matrix. In another step, a Jones matrix is computed such that the concatenation of the computed Jones matrix and the wavelength-dependent Jones matrix becomes frequency independent. The computed Jones matrix is used to control the compensations applied to the pulse shaper.

In an aspect, the pairs of data to be associated with the input switched states of polarization may have difference angles in the range of about 60° to about 120°. Depending on the state of polarization of the optical signal at the input to the transmitting Jones matrix switch, a different pair of the four states may be selected to have the appropriate difference angle.

The method and apparatus provides for wavelength-parallel Jones matrix (or equivalently Muller matrix) sensing of an optical signal with an arbitrary input SOP, and all-order PMD compensation based on a computed wavelength-dependent Jones matrix (or equivalently Muller matrix) to control the correction of the received signal.

In another aspect, a method of compensating for PMD includes: providing a pre-compensation signal indicative of wavelength-dependent polarization effects in a optical system; spatially dispersing wavelength components of an optical signal in a spatial light modulator (SLM) disposed at a transmitting end thereof; and independently adjusting the polarization transfer matrix of multiple regions of the SLM to pre-compensate the optical signal for distortions caused by the wavelength-dependent polarization effects in the optical system. In this configuration, the PMD is measured as before, at the receiving end, and a low-bandwidth signal transmitted from the receiving end to the transmitting end so as to control the Jones matrix properties of the SLM. This may fully or partially pre-compensate for the transmission system induced PMD.

While the methods disclosed herein have been described and shown with reference to particular steps performed in a particular order, it will be understood that these steps may be combined, sub-divided, or reordered to from an equivalent method without departing from the teachings of the present invention. Accordingly, unless specifically indicated herein, the order and grouping of steps is not a limitation of the present invention.

The apparatus and methods described herein may be controlled by a microprocessor controller, computer, or the like, which may be either a separate unit or integral to one of the other component units. The instructions for implementing processes of the apparatus or method may be provided on computer-readable storage media or memories, such as a cache, buffer, RAM, removable media, hard drive or other computer-readable storage media. Computer-readable storage media may include various types of volatile and nonvolatile storage media. The functions, acts or tasks illustrated in the figures or described herein may be executed in response to one or more sets of instructions stored in or on computer-readable storage media. The functions, acts or tasks may be independent of the particular type of instruction set, storage media, processor or processing strategy and may be performed by software, hardware, integrated circuits, firmware, micro code and the like, operating alone or in combination. Some aspects of the functions, acts, or tasks may be performed by dedicated hardware.

In an embodiment, the instructions may be stored on a removable media device for reading by local or remote systems. In other embodiments, the instructions may be stored in a remote location for transfer through a computer network, a local or wide area network, by wireless techniques, or over telephone lines. In yet other embodiments, the instructions are stored within a given computer, system, or device.

In an aspect, a computer, controller, or similar programmable device may be used to receive the output of a polarimeter, compute the corrections to be applied to the received signal, and to control the operation of a pulse shaper so as to compensate for wavelength-dependent polarization-mode-related distortions of a signal received over a transmission system.

Although the present invention has been explained by way of the embodiments described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. An apparatus for compensating distortion of an optical signal, comprising:
   a receiver, adapted to accept the optical signal from a proximal end of an optical fiber, further comprising:
   a polarimeter;
   a pulse shaper; and
   a controller configured to use wavelength-dependent polarization measurements output by the polarimeter to control the pulse shaper,
   wherein the optical signal is controlled to have at least two discrete states of polarization (SOP) prior to coupling the optical signal to a distal end the optical fiber.

2. The apparatus of claim 1, wherein the SOP is controlled by a polarization transfer matrix switch.

3. The apparatus of claim 1, wherein the polarimeter is comprised of a plurality of optical filters, spaced apart in wavelength and having substantially the same bandwidth.

4. The apparatus of claim 1, wherein the pulse shaper is configured to compensate the received signal for all orders of polarization mode distortion (PMD) consistent with the bandwidth of the optical filters.

5. The apparatus of claim 1, wherein the SOP has at least two discrete states that are substantially orthogonal to each other when displayed on a Poincare sphere.

6. The apparatus of claim 1, wherein a rate of modifying the optical signal is substantially less than a data rate of data to be modulated onto the optical signal prior to coupling to the distal end of the optical fiber.

7. The apparatus of claim 1, wherein the pulse shaper includes a spatial light modulator (SLM).

8. The apparatus of claim 7, wherein the SLM is a liquid crystal modulator (LCM).

9. The apparatus of claim 8, wherein the LCM has four layers, each layer oriented at a fixed angle with respect to the adjacent layer.

10. The apparatus of claim 7, wherein the pulse shaper disperses a beam of the accepted optical signal, adjusts at least a polarization of the optical signal at a plurality of wavelengths, and converts the adjusted optical signal to another beam.

11. The apparatus of claim 10, wherein the pulse shaper adjusts a phase of the optical signal at a plurality of wavelengths.

12. The apparatus of claim 10, wherein the another beam is coupleable to a photodetector.

13. The apparatus of claim 10, wherein the another beam is coupleable to an input to another optical fiber.

14. The apparatus of claim 1, wherein the pulse shaper is controlled to compensate for a wavelength-dependent polarization characteristic of the coupled optical signal at the proximal end of the optical fiber.

15. The apparatus of claim 14, wherein the optical signal is compensated for a wavelength-dependent phase.

16. The apparatus of claim 14, wherein the compensated optical signal has a substantially wavelength-independent polarization characteristic.

17. The apparatus of claim 1, wherein a correction Jones matrix to a measured wavelength-dependent Jones matrix is determined such that a concatenation of the correction Jones matrix and the wavelength-dependent Jones matrix is wavelength independent, and the pulse shaper is controlled based on the correction Jones matrix.

18. The apparatus of claim 1, wherein the polarimeter measures the SOP of the optical signal at the proximal end of the optical fiber in a wavelength-parallel manner.

19. The apparatus of claim 18, wherein the measurement time of the polarimeter is shorter time than a duration of a state of the polarization transfer matrix switch.

20. The apparatus of claim 1, wherein a first polarization state of the light at the distal end of the fiber is about linear 0° and a second polarization state of the light at the distal end of the optical fiber is about linear 45° with respect to the first polarization.

21. The apparatus of claim 1, wherein at least two of the discrete polarization states are substantially orthogonal to each other on a Poincare sphere when measured at the distal end of the optical fiber.

22. A method of compensating for distortion of an optical signal used for transmitting data, comprising the acts of:
receiving an output optical signal from an optical transmission system, wherein a state-of-polarization (SOP) of an input optical signal to the transmission system is periodically modified to have at least two discrete polarization states prior to transmission;
measuring a SOP of the output optical signal as a function of wavelength for a plurality of input SOP states to determine a first frequency dependent Jones matrix representing the transmission system;
determining a second Jones matrix such that a concatenation of a first Jones matrix and the second Jones matrix is frequency independent and;
adjusting the polarization of the output signal using a wavelength-dependent correction determined from the second Jones matrix.

23. The method of claim 22, wherein a wavelength-dependent phase adjustment performed.

24. The method of claim 22, wherein the SOP of the input optical signal is periodically modified to at least two predetermined polarization states.

25. The method of claim 22, wherein a periodic modification rate is low compared with a data rate of data modulated on the optical signal.

26. The method of claim 22, further comprising: for a pair of output signals associated with a pair of Jones matrix switch states, computing an average wavelength-dependent dependent difference angle on a Poincare sphere.

27. The method of claim 26, wherein the pair of output signals having an average difference angle of approximately 90° is selected, and a first signal of the pair of signals is associated with a 0° linear input SOP state and a cross-product between the first and a second signal of the pair of signals is associated with a 45° input SOP state.

28. The method of claim 27 wherein the SOP of the first signal and the cross-product of the first signal and the second signal are used to compute a wavelength-dependent Jones matrix characterizing the transmission system and a correction Jones matrix so as to minimize a wavelength dependence of the concatenation of the transmission system Jones matrix and the correction Jones matrix.

29. The method of claim 27, wherein the average difference angle between the pair of output signals selected is between about 60° and about 120°.

30. The method of claim 22, wherein the correction to the received optical signal is performed in an optical pulse shaper.

31. An apparatus for transmitting an optical signal having data modulated thereon, comprising:
a polarization controller, the controller being configurable to repeatedly modify a SOP of the optical signal to at least two discrete polarization states,
wherein a switching rate of the polarization controller is substantially lower than a data rate of the data modulated on the optical signal, and an output of the polarization controller is coupleable to a transmission system.

32. The apparatus of claim 31, further comprising an optical modulator adapted to accept an optical signal and to modulate data onto the optical signal.

33. The apparatus of claim 31, wherein the SOP has at least two discrete states which are orthogonal on a Poincare sphere.

34. The apparatus of claim 31, wherein the at least two discrete polarization states is four discrete polarization states.

35. A method of transmitting an optical signal, comprising the steps of:
accepting the optical signal modulated with data at a data rate;
periodically modifying the state-of polarization (SOP) of the optical signal into repeatable discrete polarization states using a polarization controller; and
coupling the optical signal to an optical transmission device,
wherein a rate of switching of the polarization controller is substantially lower than the data rate of the data.

36. A system for compensation of distortion of an optical signal, comprising:
a transmitting portion, further comprising:
a polarization controller, the controller being configurable to periodically modify the state of polarization (SOP) of an input optical signal between at least two discrete output optical signal polarization states, the output optical signal being coupleable to an input of an optical transmission device; and
a receiving portion adapted to receive an optical signal output by the optical transmission device, further comprising;

a polarimeter; and
a pulse shaper.

37. The system of claim 36, wherein the transmitting portion further comprises:
a modulator adapted to receive the optical signal and to modulate data onto the optical signal, the optical signal being couplable to an input of the polarization transfer matrix switch.

38. The system of claim 36, wherein the transmission system is an optical fiber.

39. A computer program product, stored on a non-transitory computer-readable medium, comprising:
instructions for configuring a computer to:
receive a measurement output of a polarimeter measuring an optical signal received from a transmission system;
determine a wavelength-dependent Jones matrix of the transmission system using the polarimeter measurement output; and
determine a correction Jones matrix such that a concatenation of the transmission system Jones matrix and the correction Jones matrix is a wavelength-independent Jones matrix;
wherein a state of polarization of the optical signal has been modified in a periodic manner to at least two discrete states of polarization prior to transmission.

40. The computer program product of claim 39, further comprising instructions configuring the computer to control a pulse shaper, the pulse shaper configured to adjust a polarization of the received optical signal based on the correction Jones matrix.

41. The computer program product of claim 40, wherein a wavelength-dependent phase of the received optical signal is adjusted.

42. A system for transmission of signals over an optical fiber, comprising:
a transmitting portion, further comprising:
an optical signal generator to generate an optical signal; and
a polarization modulator configured to periodically modify an SOP of the optical signal to at least two discrete polarization states; and
a receiving portion adapted to receive an optical signal, further comprising;
a processor,
a polarimeter adapted to measure a SOP of a received optical signal as a function of wavelength for the at least two discrete polarization states of the optical signal produced by the polarization modulator to permit the computation of a first frequency dependent Jones matrix representing a transmission system disposed between the transmitting portion and the receiving portion;
the processor configured to compute a second Jones matrix such that a concatenation of the first Jones matrix and the second Jones matrix is a frequency independent Jones matrix; and
a pulse shaper;
wherein the pulse shaper is configured to adjust a polarization of the received optical signal based on the frequency independent Jones matrix.

* * * * *

UNITED STATES PATENT AND TRADEMARK OFFICE
CERTIFICATE OF CORRECTION

PATENT NO. : 8,600,243 B2  
APPLICATION NO. : 12/425919  
DATED : December 3, 2013  
INVENTOR(S) : Houxun Miao et al.

Page 1 of 1

It is certified that error appears in the above-identified patent and that said Letters Patent is hereby corrected as shown below:

<u>In the Claims</u>

In column 14, claim 1, line 49, after "to a distal end" insert --of--.

In column 15, claim 23, line 67, after "phase adjustment" insert --is--.

In column 16, claim 26, line 10, before "angle on a Poincare" delete "difference".

Signed and Sealed this  
Twenty-seventh Day of May, 2014

Michelle K. Lee  
*Deputy Director of the United States Patent and Trademark Office*